US005646755A

United States Patent [19]

Okada et al.

[11] Patent Number: 5,646,755

[45] Date of Patent: Jul. 8, 1997

[54] METHOD AND APPARATUS FOR FERROELECTRIC LIQUID CRYSTAL DISPLAY HAVING GRADATIONAL DISPLAY

[75] Inventors: Shinjiro Okada, Isehara; Yutaka Inaba, Kawaguchi; Kazunori Katakura, Atsugi, all of Japan

[73] Assignee: Canon Kabushiki Kaisha, Tokyo, Japan

[21] Appl. No.: 688,221

[22] Filed: Jul. 29, 1996

Related U.S. Application Data

[63] Continuation of Ser. No. 171,429, Dec. 22, 1993, abandoned.

[30] Foreign Application Priority Data

Dec. 28, 1992 [JP] Japan .................................... 4-358846

[51] Int. Cl.$^6$ ........................... G02F 1/133; G02F 1/141; G09G 3/36

[52] U.S. Cl. ................................ 345/97; 345/89; 345/97; 349/146; 349/173

[58] Field of Search ................................. 359/56, 85, 55, 359/100; 345/89, 97, 95, 94, 147

[56] References Cited

U.S. PATENT DOCUMENTS

| | | | |
|---|---|---|---|
| 4,367,924 | 1/1983 | Clark et al. | 350/334 |
| 4,563,059 | 1/1986 | Clark et al. | 350/330 |
| 4,639,089 | 1/1987 | Okada et al. | 350/341 |
| 4,655,561 | 4/1987 | Kanbe et al. | 350/350 S |
| 4,681,404 | 7/1987 | Okada et al. | 350/350 S |
| 4,725,129 | 2/1988 | Kondo et al. | 359/56 |
| 4,815,823 | 3/1989 | Kaneko | 350/336 |
| 4,902,107 | 2/1990 | Tsuboyama et al. | 350/350 S |
| 4,917,470 | 4/1990 | Okada et al. | 350/333 |
| 4,929,058 | 5/1990 | Numao | 359/56 |
| 4,938,574 | 7/1990 | Kaneko et al. | 359/56 |
| 5,010,327 | 4/1991 | Wakita et al. | 345/89 |
| 5,011,269 | 4/1991 | Wakita et al. | 359/56 |
| 5,119,219 | 6/1992 | Terada et al. | 359/56 |
| 5,151,803 | 9/1992 | Wakita et al. | 359/56 |
| 5,379,138 | 1/1995 | Okada | 359/56 |

FOREIGN PATENT DOCUMENTS

| | | | |
|---|---|---|---|
| 0510606 | 10/1992 | European Pat. Off. | G09G 3/36 |
| 56-107216 | 8/1981 | Japan | G02F 1/137 |
| 62-102230 | 5/1987 | Japan | 359/56 |
| 2-267523 | 11/1990 | Japan | 359/56 |
| 2164776 | 3/1986 | United Kingdom | G09G 3/36 |

OTHER PUBLICATIONS

Applied Physics Letters vol. 36, No. 11 (Jun. 1, 1980) pp. 899–901.

N.A. Clark, et al., MCLC (1983) vol. 94, pp. 213–234.

*Primary Examiner*—William L. Sikes
*Assistant Examiner*—Tai Van Duong
*Attorney, Agent, or Firm*—Fitzpatrick, Cella, Harper & Scinto

[57] ABSTRACT

A liquid crystal device is constituted by a first electrode substrate having thereon a group of first electrodes, a second electrode substrate having thereon a group of second electrodes intersecting the first electrodes, and a liquid crystal disposed between the first and second electrode substrates so as to form a pixel at each intersection of the first and second electrodes. The liquid crystal device is driven for gradational display by selecting and writing in a pixel plural times in one frame of display for gradational display, wherein a second and a subsequent writing among the plural times of writing is performed by applying a bipolar pulse of identical shapes in positive and negative polarities.

6 Claims, 14 Drawing Sheets

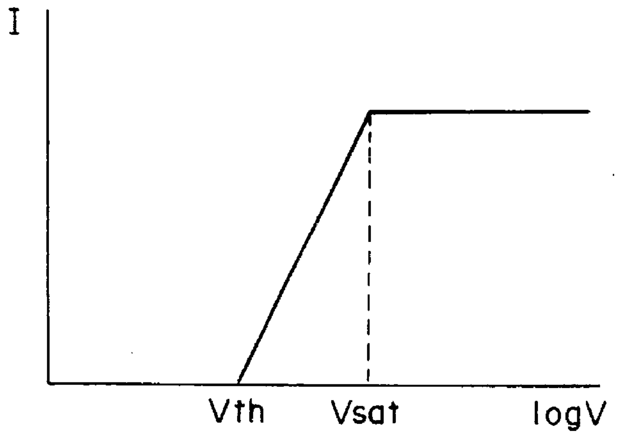
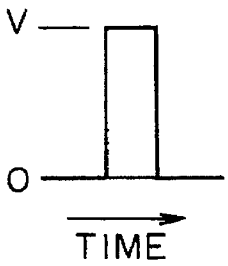
FIG. 1A FIG. 1B
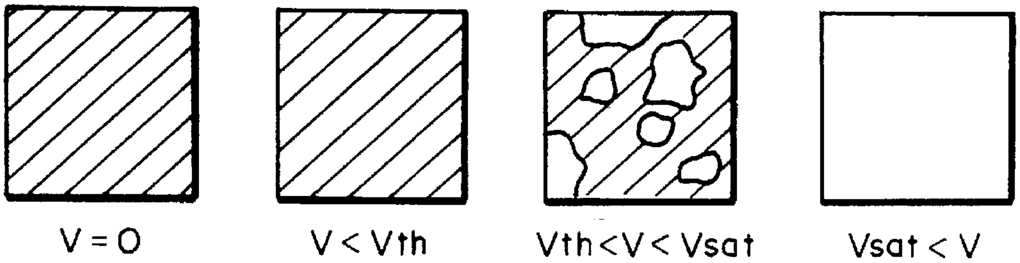
FIG. 2A FIG. 2B FIG. 2C FIG. 2D

METHOD AND APPARATUS FOR FERROELECTRIC LIQUID CRYSTAL DISPLAY HAVING GRADATIONAL DISPLAY

This application is a continuation of application Ser. No. 08/171,429 filed Dec. 22, 1993, now abandoned.

FIELD OF THE INVENTION AND RELATED ART

The present invention relates to a method and apparatus for liquid crystal display for computer terminals, television receivers, word processors, typewriters, etc., inclusive of a light valve for projectors, a view finder for video camera recorders, etc.

There have been known liquid crystal display devices including those using twisted-nematic (TN) liquid crystals, guest-host-type liquid crystals, smectic (Sm) liquid crystals, etc.

In a liquid crystal device, such a liquid crystal is disposed between a pair of substrates and changes an optical transmittance therethrough depending on voltages applied thereto. The electric field applied to the liquid crystal layer changes depending on the thickness of the liquid crystal layer, i.e., the spacing between the substrates.

Clark and Lagerwall have disclosed a bistable ferroelectric liquid crystal device using a surface-stabilized ferroelectric liquid crystal in, e.g., Applied Physics Letters, Vol. 36, No. 11 (Jun. 1, 1980), p.p. 899–901; Japanese Laid-Open Patent Application (JP-A) 56-107216, U.S. Pat. Nos. 4,367,924 and 4,563,059. Such a bistable ferroelectric liquid crystal device has been realized by disposing a liquid crystal between a pair of substrates disposed with a spacing small enough to suppress the formation of a helical structure inherent to liquid crystal molecules in chiral smectic C phase (SmC*) or H phase (SmH*) of bulk state and align vertical (smectic) molecular layers each comprising a plurality of liquid crystal molecules in one direction.

Further, as a display device using such a ferroelectric liquid crystal (FLC), there is known one wherein a pair of transparent substrates respectively having thereon a transparent electrode and subjected to an aligning treatment are disposed to be opposite to each other with a cell gap of about 1–3 μm therebetween so that their transparent electrodes are disposed on the inner sides to form a blank cell, which is then filled with a ferroelectric liquid crystal, as disclosed in U.S. Pat. Nos. 4,639,089; 4,655,561; and 4,681,404.

The above-type of liquid crystal display device using a ferroelectric liquid crystal has two advantages. One is that a ferroelectric liquid crystal has a spontaneous polarization so that a coupling force between the spontaneous polarization and an external electric field can be utilized for switching. Another is that the long axis direction of a ferroelectric liquid crystal molecule corresponds to the direction of the spontaneous polarization in a one-to-one relationship so that the switching is effected by the polarity of the external electric field. More specifically, the ferroelectric liquid crystal in its chiral smectic phase show bistability, i.e., a property of assuming either one of a first and a second optically stable state depending on the polarity of an applied voltage and maintaining the resultant state in the absence of an electric field. Further, the ferroelectric liquid crystal shows a quick response to a change in applied electric field. Accordingly, the device is expected to be widely used in the field of e.g., a high-speed and memory-type display apparatus.

A ferroelectric liquid crystal generally comprises a chiral smectic liquid crystal (SmC* or SmH*), of which molecular long axes form helixes in the bulk state of the liquid crystal. If the chiral smectic liquid crystal is disposed within a cell having a small gap of about 1–3 μm as described above, the helixes of liquid crystal molecular long axes are unwound (N. A. Clark, et al., MCLC (1983), Vol. 94, p.p. 213–234).

A liquid crystal display apparatus having a display panel constituted by such a ferroelectric liquid crystal device may be driven by a multiplexing drive scheme as described in U.S. Pat. No. 4,655,561, issued to Kanbe et al to form a picture with a large capacity of pixels. The liquid crystal display apparatus may be utilized for constituting a display panel suitable for, e.g., a word processor, a personal computer, a micro-printer, and a television set.

A ferroelectric liquid crystal has been principally used in a binary (bright-dark) display device in which two stable states of the liquid crystal are used as a light-transmitting state and a light-interrupting state but can be used to effect a multi-value display, i.e., a halftone display. In a halftone display method, the areal ratio between bistable states (light transmitting state and light-interrupting state) within a pixel is controlled to realize an intermediate light-transmitting state. The gradational display method of this type (hereinafter referred to as an "areal modulation" method) will now be described in detail.

FIG. 1 is a graph schematically representing a relationship between a transmitted light quantity I through a ferroelectric liquid crystal cell and a switching pulse voltage V. More specifically, FIG. 1A shows plots of transmitted light quantities I given by a pixel versus voltages V when the pixel initially placed in a complete light-interrupting (dark) state is supplied with single pulses of various voltages V and one polarity as shown in FIG. 1B. When a pulse voltage V is below threshold Vth (V<Vth), the transmitted light quantity does not change and the pixel state is as shown in FIG. 2B which is not different from the state shown in FIG. 2A before the application of the pulse voltage. If the pulse voltage V exceeds the threshold Vth (Vth<V<Vsat), a portion of the pixel is switched to the other stable state, thus being transitioned to a pixel state as shown in FIG. 2C showing an intermediate transmitted light quantity as a whole. If the pulse voltage V is further increased to exceed a saturation value Vsat (Vsat<V), the entire pixel is switched to a light-transmitting state as shown in FIG. 2D so that the transmitted light quantity reaches a constant value (i.e., is saturated). That is, according to the areal modulation method, the pulse voltage V applied to a pixel is controlled within a range of Vth<V<Vsat to display a halftone corresponding to the pulse voltage.

However, actually, the voltage (V)—transmitted light quantity (I) relationship shown in FIG. 1 depends on the cell thickness and temperature. Accordingly, if a display panel is accompanied with an unintended cell thickness distribution or a temperature distribution, the display panel can display different gradation levels in response to a pulse voltage having a constant voltage.

FIG. 3 is a graph for illustrating the above phenomenon which is a graph showing a relationship between pulse voltage (V) and transmitted light quantity (I) similar to that shown in FIG. 1 but showing two curves including a curve H representing a relationship at a high temperature and a curve L at a low temperature. In a display panel having a large display size, it is rather common that the panel is accompanied with a temperature distribution. In such a case, however, even if a certain halftone level is intended to be displayed by application of a certain drive voltage Vap, the resultant halftone levels can be fluctuated within the range of $I_1$ to $I_2$ as shown in FIG. 3 within the same panel, thus failing to provide a uniform gradational display state.

In order to solve the above-mentioned problem, our research and development group has already proposed a drive method (hereinafter referred to as the four pulse method") in U.S. patent Appln. Ser. No. 681,933, filed Apr. 8, 1991. In the four pulse method, as illustrated in FIGS. 4 and 5, all pixels having mutually different thresholds on a common scanning line in a panel are supplied with plural pulses (corresponding to pulses (A)–(D) in FIG. 4) to show consequently identical transmitted quantities as shown at FIG. 4(D). In FIG. 5, $T_1$, $T_2$ and $T_3$ denote selection periods set in synchronism with the pulses (B), (C) and (D), respectively. Further, $Q_0$, $Q_0'$, $Q_1$, $Q_2$ and $Q_3$ in FIG. 4 represent gradation levels of a pixel, inclusive of $Q_0$ representing black (0%) and $Q_0'$ representing white (100%). Each pixel in FIG. 4 is provided with a threshold distribution within the pixel increasing from the leftside toward the right side as represented by a cell thickness increase.

Our research and development group has also proposed a drive method (a so-called "pixel shift method", as disclosed in U.S. patent Appln. Ser. No. 984,694, filed Dec. 2, 1991 and entitled "LIQUID CRYSTAL DISPLAY APPARATUS"), wherein plural scanning lines are simultaneously supplied with different scanning signals for selection to provide an electric field intensity distribution spanning the plural scanning lines, thereby effecting a gradational display.

An outline of the pixel shift method will now be described below.

A liquid crystal cell (panel) suitably used may be one having a threshold distribution within one pixel. Such a liquid crystal cell may for example have a sectional structure as shown in FIG. 6. The cell shown in FIG. 6 has an FLC layer 55 disposed between a pair of glass substrates 53 including one having thereon transparent stripe electrodes 53 constituting data lines and an alignment film 54 and the other having thereon a ripple-shaped film 52 of, e.g., an insulating resin, providing a saw-teeth shape cross section, transparent stripe electrodes 52 constituting scanning lines and an alignment film 54. In the liquid crystal cell, the FLC layer 55 between the electrodes has a gradient in thickness within one pixel so that the switching threshold of FLC is also caused to have a distribution. When such a pixel is supplied with an increasing voltage, the pixel is gradually switched from a smaller thickness portion to a larger thickness portion.

The switching behavior is illustrated with reference to FIG. 7A. Referring to FIG. 7A, a panel in consideration is assumed to have portions having temperatures $T_1$, $T_2$ and $T_3$. The switching threshold voltage of FLC is lowered at a higher temperature. FIG. 7A shows three curves each representing a relationship between applied voltage and resultant transmittance at temperature $T_1$, $T_2$ or $T_3$.

Incidentally, the threshold change can be caused by a factor other than a temperature change, such as a layer thickness fluctuation, but an embodiment of the present invention will be described while referring to a threshold change caused by a temperature change, for convenience of explanation.

As is understood from FIG. 7A, when a pixel at a temperature $T_1$ is supplied with a voltage Vi, a transmittance of X% results at the pixel. If, however, the temperature of the pixel is increased to $T_2$ or $T_3$, a pixel supplied with the same voltage Vi is caused to show a transmittance of 100%, thus failing to perform a normal gradational display. FIG. 7C shows inversion states of pixels after writing. Under such conditions, written gradation data is lost due to a temperature change, so that the panel is applicable to only a limited use of display device.

In contrast thereto, it becomes possible to effect a gradational display stable against a temperature change by display data for one pixel on two scanning lines S1 and S2 as shown in FIG. 7D.

The drive scheme will be described in further detail hereinbelow.

(1) A ferroelectric liquid crystal cell as shown in FIG. 12 having a continuous threshold distribution within each pixel is provided. It is also possible to use a cell structure providing a potential gradient within each pixel as proposed by our research and development group in U.S. Pat. No. 4,815,823 or a cell structure having a capacitance gradient. In any way, by providing a continuous threshold distribution within each cell, it is possible to form a domain corresponding to a bright state and a domain corresponding to a dark state in mixture within one pixel, so that a gradational display becomes possible by controlling the areal ratio between the domains.

The method is applicable to a stepwise transmittance modulation (e.g., at 16 levels) but a continuous transmittance modulation is required for an analog gradational display.

(2) Two scanning lines are selected simultaneously. The operation is described with reference to FIG. 8. FIG. 8A shows an overall transmittance—applied voltage characteristic for combined pixels on two scanning lines. In FIG. 8A, a transmittance of 0–100% is allotted to be displayed by a pixel B on a scanning line 2 and a transmittance of 100–200% is allotted to be displayed by a pixel A on a scanning line 1. More specifically, as one pixel is constituted by one scanning line, a transmittance of 200% is displayed when both the pixels A and B are wholly in a transparent state by scanning two scanning lines simultaneously. Herein, two scanning lines are selected for displaying one gradation data but a region having an area of one pixel is allotted to displaying one gradation data. This is explained with reference to FIG. 8B.

At temperature $T_1$, inputted gradation data is written in a region corresponding to 0% at an applied voltage $V_0$ and in a region corresponding to 100% at $V_{100}$. As shown in FIG. 8B, at temperature $T_1$, the range (pixel region) is wholly on the scanning line 2 (as denoted by a hatched region in FIG. 8B). When the temperature is raised from $T_1$ to $T_2$, however, the threshold voltage of the liquid crystal is lowered correspondingly, the same amplitude of voltage causes an inversion in a larger region in the pixel than at temperature $T_1$.

For correcting the deviation, a pixel region at temperature $T_2$ is set to span on scanning lines 1 and 2 (a hatched portion at $T_2$ in FIG. 8B).

Then, when the temperature is further raised to temperature $T_3$, a pixel region corresponding to an applied voltage in the range of $V_0$–$V_{100}$ is set to be on only the scanning line 1 (a hatched portion at $T_3$ in FIG. 8B).

By shifting the pixel region for a gradational display on two scanning lines depending on the temperature, it becomes possible to retain a normal gradation display in the temperature region of $T_1$–$T_3$.

(3) Different scanning signals are applied to the two scanning lines selected simultaneously. As described at (2) above, in order to compensate for the change in threshold of liquid crystal inversion due to a temperature range by selecting two scanning lines simultaneously, it is necessary to apply different scanning signals to the two selected scanning lines. This point is explained with reference to FIG. 7.

Scanning signals applied to scanning lines 1 and 2 are set so that the threshold of a pixel B on the scanning line 2 and the threshold of a pixel A on the scanning line 1 varies continuously. Referring to FIG. 7B, a transmittance-voltage curve at temperature 1 indicates that a transmittance up to 100% is displayed in a region on the scanning line 2 and a transmittance thereabove and up to 200% is displayed in a region on the scanning line 1. It is necessary to set the transmittance curve so that it is continuous and has an equal slope spanning from the pixel B to the pixel A.

As a result, even if the pixel A on the scanning line 1 and the pixel B on the scanning line 2 are set to have identical cell shapes as shown in FIG. 9B, it becomes possible to effect a display substantially similar to that in the case where the pixel A and the pixel B are provided with a continuous threshold characteristic (cell at the right side of FIG. 7B).

In case of gradational display according to the pixel shift method or the four pulse method, it is necessary to effect plural times of writing for displaying one image data. In the case of the four-pulse method shown in FIG. 5, for example, the pulses (B), (C) and (D) are required as writing pulses.

In order to effect proper gradational display by plural times of writing, additivity is required of the gradation density (inverted region). This is explained with reference to FIGS. 10A–10C. In case where a drive waveform including three pulses shown in FIG. 10C is applied to a pixel having a threshold distribution as shown in FIG. 6, the pixel is reset into black by a first pulse (1), then partly inverted to form a white domain up to position c by a pulse (2) of a reverse polarity and then caused to form a black domain up to position b by a pulse (3). As a result, the pixel is displayed at a gradation density or level of $\overline{cd}/\overline{ad}\times 100\%$.

An important point in the above-mentioned series of writing operation is that a domain wall formed at position c is not moved when the black domain from a to b is formed by applying the pulse (3). According to our experiments, however, there was observed a phenomenon that the domain wall at position c was moved to a position c' according to the application of the pulse (3) as shown in FIG. 10B. This is considered to be a phenomenon attributable to a characteristic that the threshold of domain wall movement is lower than the threshold of generation of a domain nucleus followed by a domain wall movement. If a phenomenon as shown in FIG. 10B occurs, it is difficult to effect excellent gradational display with good reproducibility.

It has been also tried to suppress the domain wall movement by improvement of liquid crystal materials, but a satisfactory characteristic has not been attained as yet.

SUMMARY OF THE INVENTION

An object of the present invention is to provide a liquid crystal display method having solved the above-mentioned problem and capable of effecting gradational display with excellent reproducibility without using a specific liquid crystal material.

Another object of the present invention is to provide a liquid crystal display method including a drive means effective for suppressing the domain wall movement to effect gradational display with excellent reproducibility.

A further object of the present invention is to provide an apparatus for practicing the display method.

According to the present invention, there is provided a driving method for gradational display on a liquid crystal device of the type comprising a first electrode substrate having thereon a group of first electrodes, a second electrode substrate having thereon a group of second electrodes intersecting the first electrodes, and a liquid crystal disposed between the first and second electrode substrates so as to form a pixel at each intersection of the first and second electrodes; said driving method comprising:

selecting and writing in a pixel plural times in one frame of display for gradational display, wherein a second and a subsequent writing among the plural times of writing is performed by applying a bipolar pulse of identical shapes in positive and negative polarities.

According to another aspect of the present invention, there is provided an apparatus for practicing the above-mentioned method.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1A and 1B are graphs illustrating a relationship between switching pulse voltage and a transmitted light quantity contemplated in a conventional areal modulation method.

FIGS. 2A–2D illustrate pixels showing various transmittance levels depending on applied pulse voltages.

DESCRIPTION OF THE PREFERRED EMBODIMENTS

In the present invention, a pixel on a selected scanning line is written by plural times of writing, while effecting a second writing or a writing thereafter of the plural times of writing by applying a writing pulse after applying a preceding pulse of an identical shape as and an opposite polarity to the writing pulse. Herein, the second writing or a writing thereafter means a writing operation applied to a pixel wherein a domain wall has been already formed. On the other hand, a first writing means a writing operation to a pixel like one after resetting which is wholly black or white and is free from a domain wall. The formation of a domain wall in a pixel means that the pixel contains a partly inverted region.

In other words, the second or subsequent writing is performed by applying a balanced or symmetrical bipolar pulse. The preceding pulse before the writing pulse in the second or subsequent writing may be applied in a polarity identical to that of a writing pulse in the preceding writing (e.g., first writing).

In order to write in a pixel already having a domain wall therein, it is effective to use a bipolar symmetrical writing waveform whereby the additivity of domain regions within a pixel is satisfied. This is effective not only for the three-pulse method but also for other methods such as the pixel shift method and the four-pulse method wherein a pixel is written by plural times of writing.

The reason why the additivity of domain regions is satisfied by the above operation has not been fully clarified as yet. The operation is based on a concept that the domain wall movement in the second writing is compensated for by a preliminary domain wall movement in the reverse direction. Actually, however, the domain wall movement appears to be suppressed by application of a bipolar or alternating pulse as in the present invention. Accordingly, the effect of such a bipolar pulse application may result in a complex process also including additional formation of an inversion nucleus and disappearance thereof.

Figure 3:
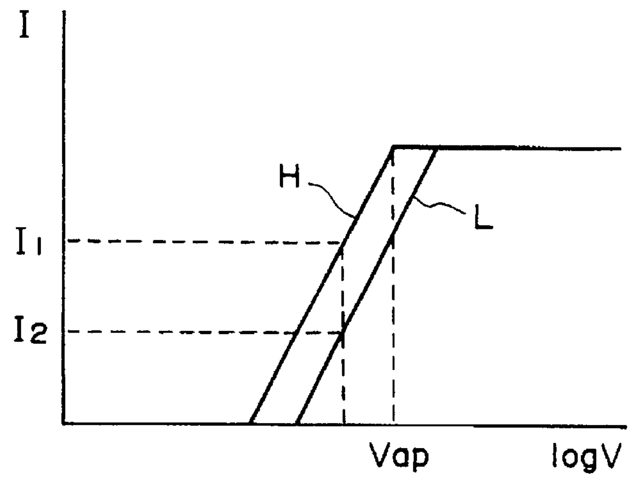
FIG. 3 is a graph for describing a deviation in threshold characteristic due to a temperature distribution.
Figure 4:
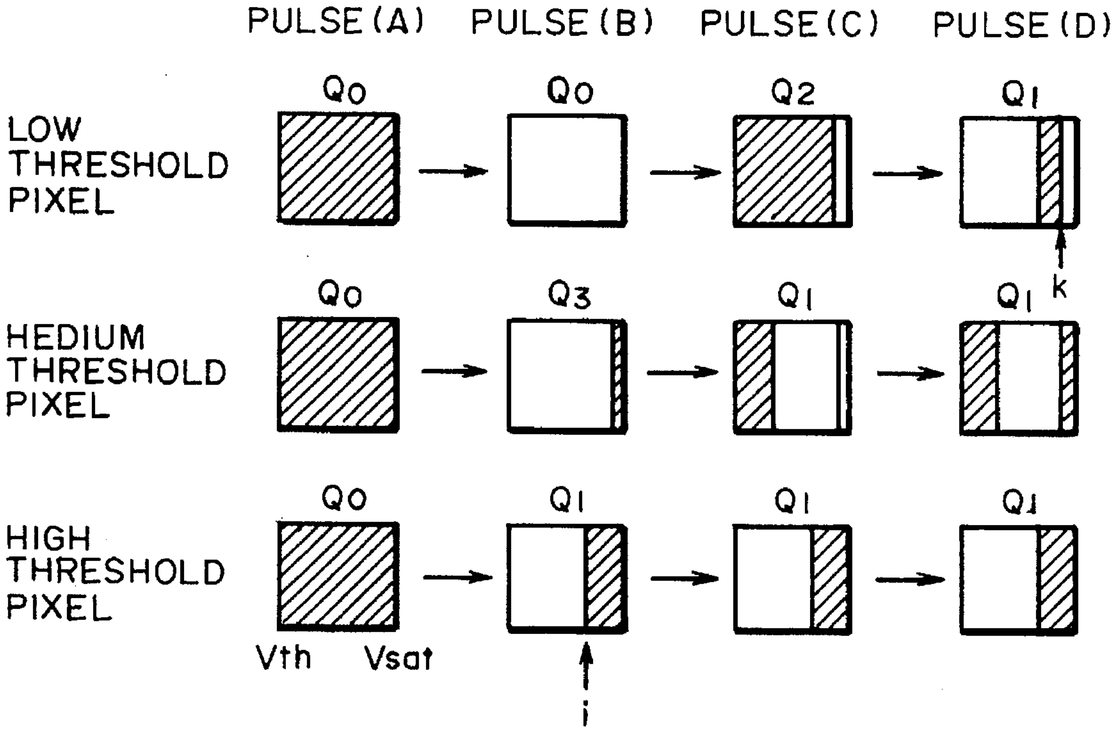
FIG. 4 is an illustration of pixels showing various transmittance levels given in the conventional four-pulse method.
Figure 5:
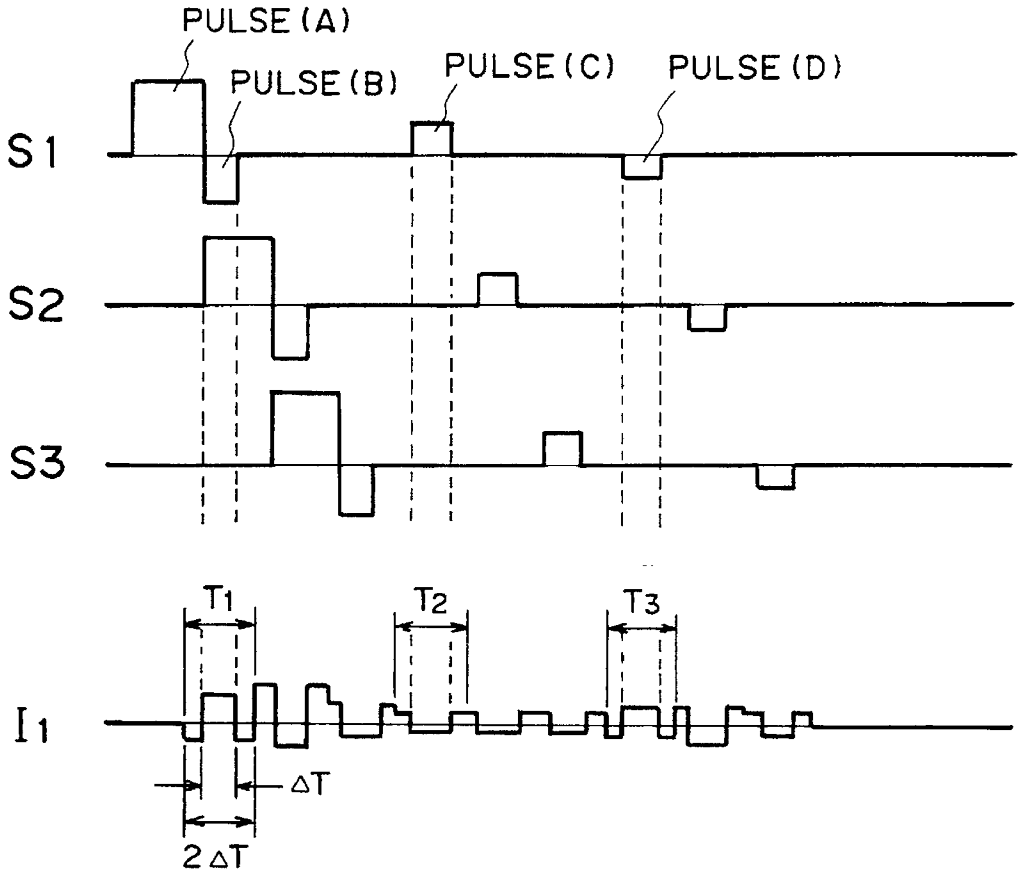
FIG. 5 is a time chart for describing the four-pulse method.
Figure 6:
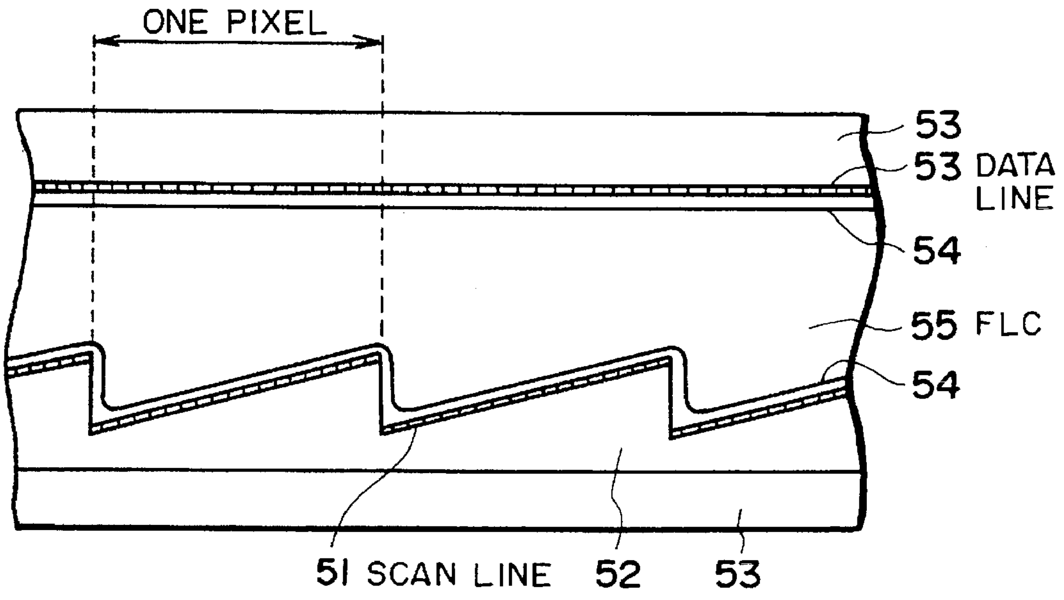
FIG. 6 is a schematic sectional view of a liquid crystal cell applicable to the invention.
Figure 7A:
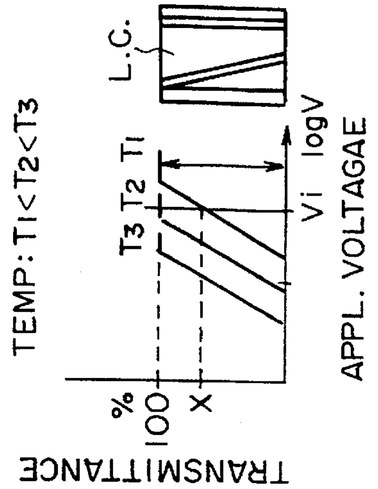
FIGS. 7A–7D are views for illustrating a pixel shift method.
Figure 7B:
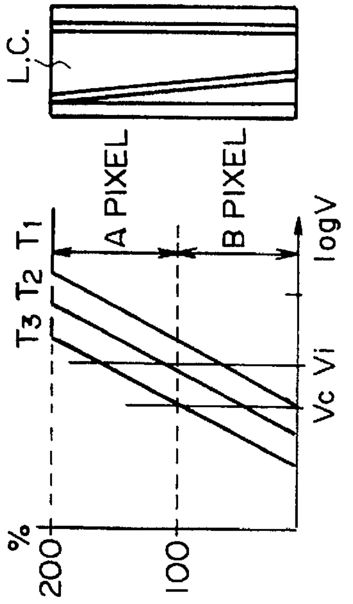
Figure 7C:
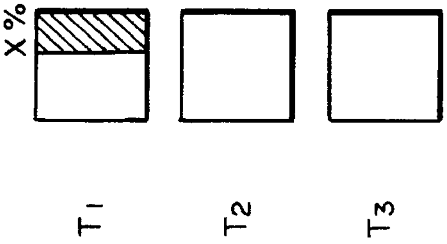
Figure 7D:
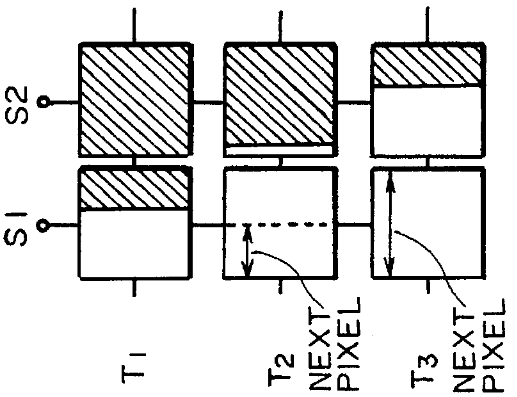
Figure 8B:
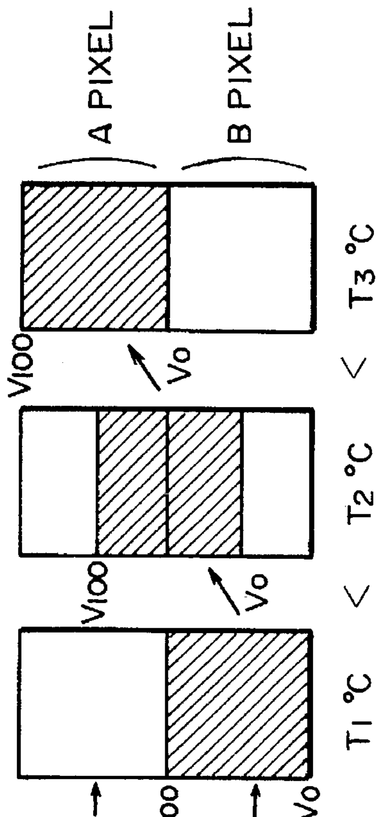
FIGS. 8A, 8B, 9A and 9B are other views for illustrating a pixel shift method.
Figure 8A:
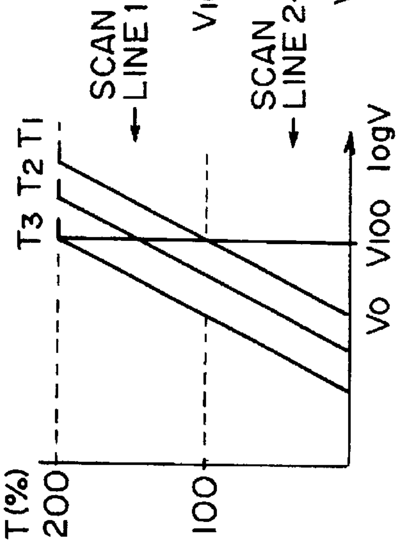
Figure 9A:
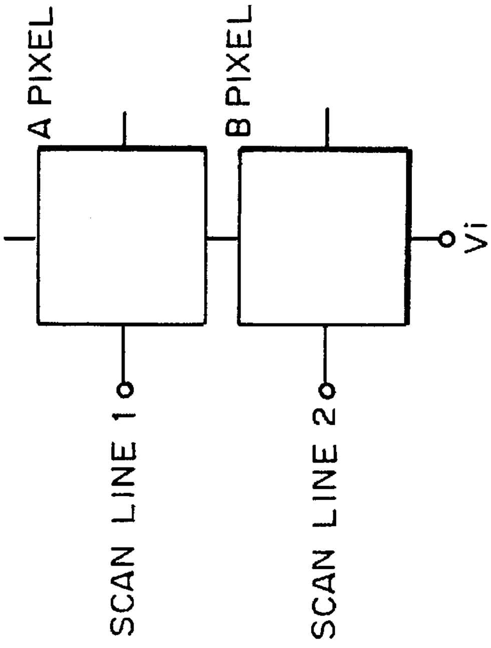
Figure 9B:
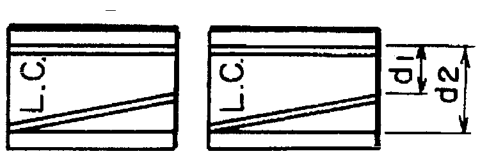
Figure 10A:
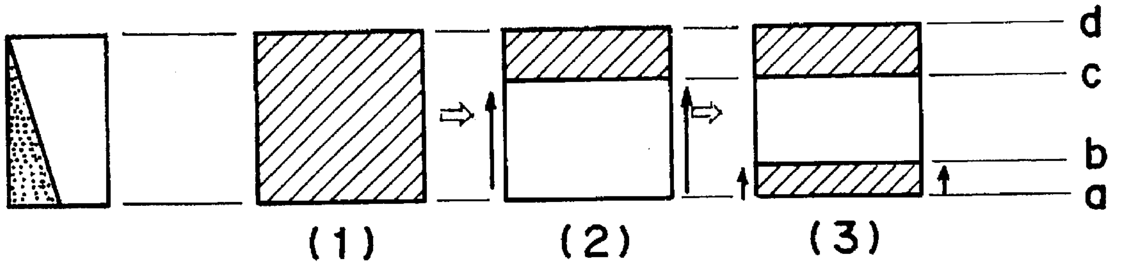
FIGS. 10A–10C illustrate a drive waveform (FIG. 10C) and resultant display states (FIGS. 10A–10B) according to a conventional three-pulse method.
Figure 10B:
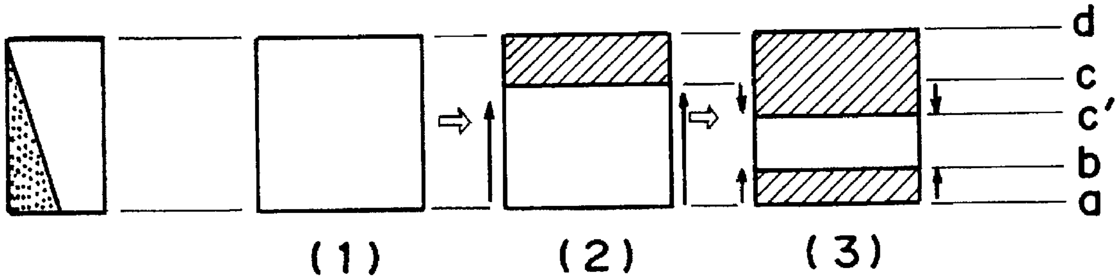
Figure 10C:
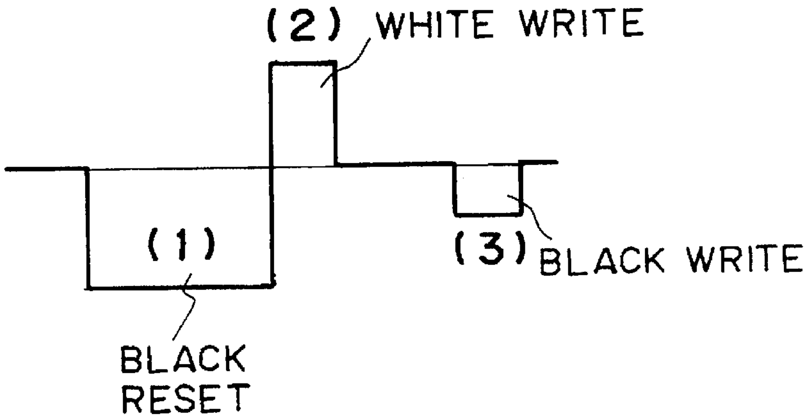
Figure 11A:
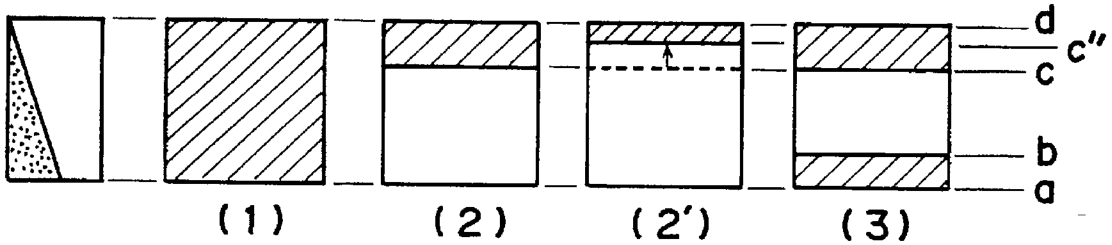
FIG. 11A illustrates a pixel state change according to an embodiment of the invention and FIG. 11B shows a drive waveform used in the embodiment.
Figure 11B:
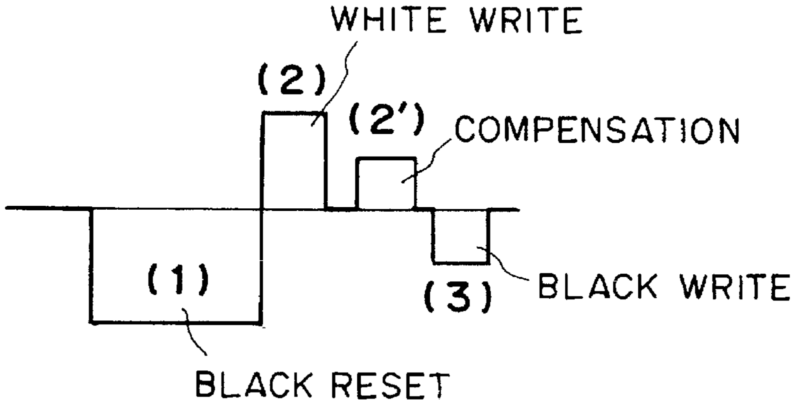

FIGS. 11A and 11C illustrate an embodiment of the present invention which may be easily understood when compared with FIGS. 10A–10C. In this embodiment, a compensation pulse (2') is applied as shown in FIG. 11B. It has been observed that a domain wall between white and black regions moves instantaneously or stably in a direction of an arrow shown at FIG. 11A (2') so as to enlarge the white domain up to a position C". According to the movement, an excessive enlargement of a black domain (excessive reduction of a white domain) on application of a subsequent pulse (3) as encountered in the case of FIG. 10B (3) is substantially prevented.

In order to cause the above-mentioned phenomenon at a good reproducibility. It is desired to design the compensation pulse (2') to have an identical pulse width and an identical peak value (absolute value) but of an opposite polarity compared with the pulse (3). The pulses (1), (2), (2') and (3) can be applied continuously or intermittently with a pause period therebetween. Desirably, the reset pulse (1) and the first writing pulse (2) may be applied continuously, and a pause period may be placed between the pulse (2) and the compensation pulse (2') as shown in FIG. 11B.

It is further preferred that the reset pulse, the first writing pulse and the compensation pulse (or second writing pulse) are designed to have gradually decreasing amplitudes.

The liquid crystal material used in the present invention may preferably be a known ferroelectric liquid crystal but may also be an anti-ferroelectric liquid crystal or another liquid crystal such as a nematic liquid crystal or a cholesteric liquid crystal if it has an inversion threshold and is applicable to an areal gradation display method.

Figure 12:
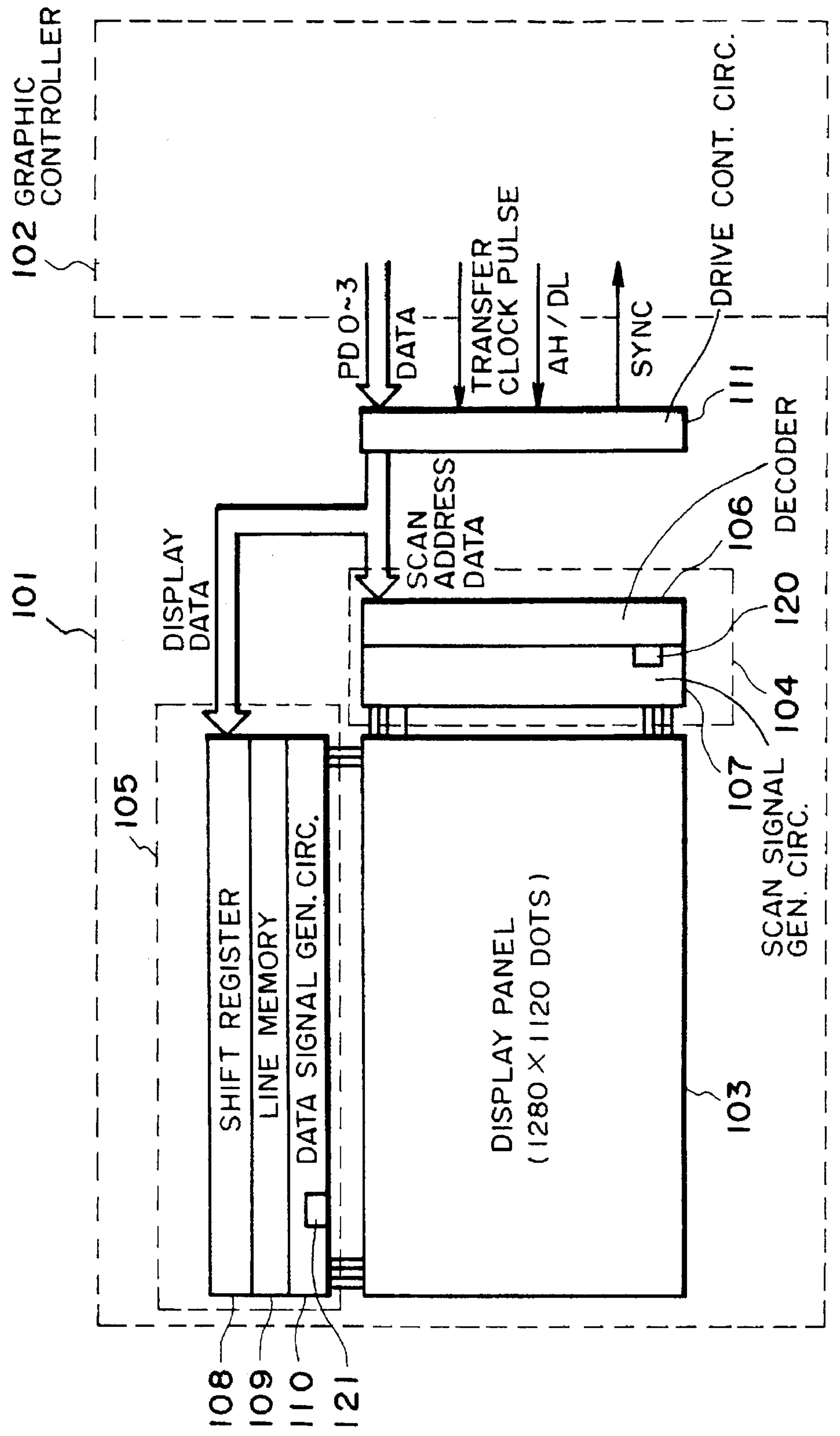
FIG. 12 is a block diagram of an embodiment of the liquid crystal display apparatus according to the present invention.
Figure 13:
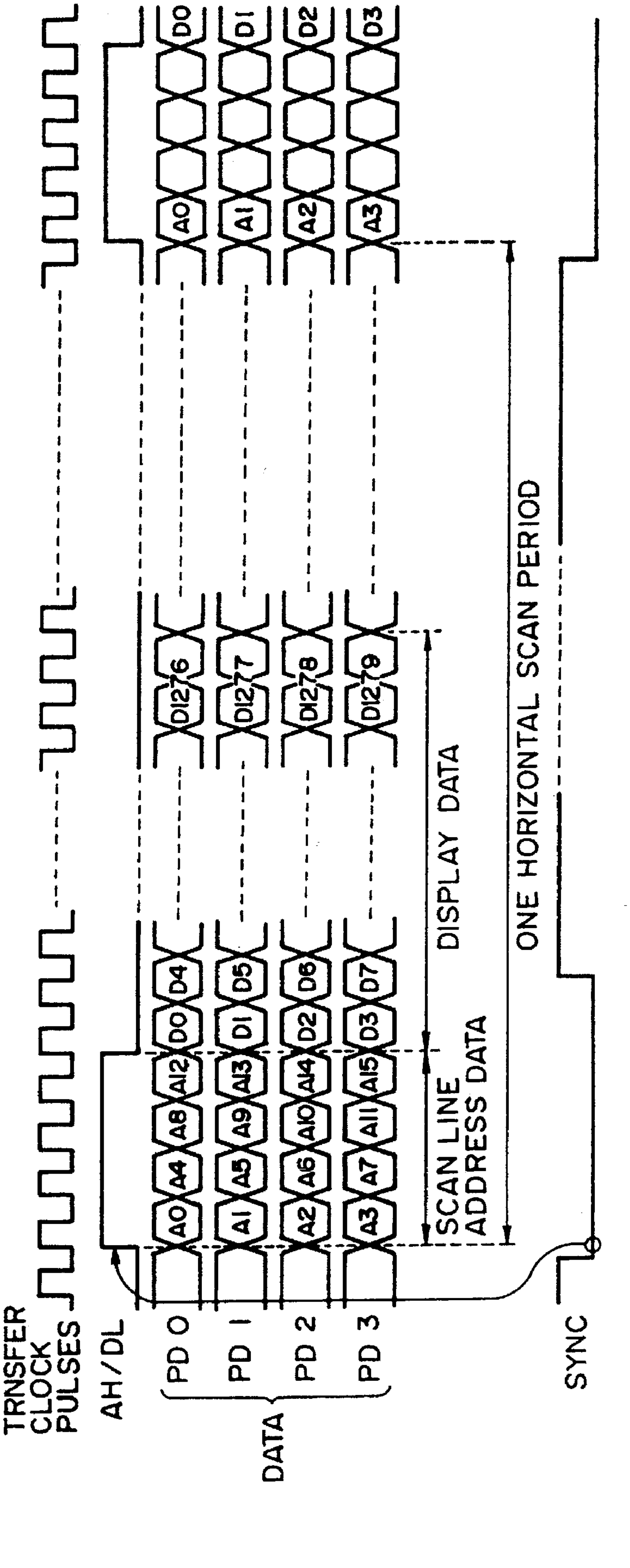
FIG. 13 is a time chart for the apparatus shown in FIG. 12.

FIG. 12 is a block diagram of a control system for a display apparatus according to the present invention, and FIG. 13 is a time chart for communication of image data therefor. Hereinbelow, the operation of the apparatus will be described with reference to these figures.

A graphic controller 102 supplies scanning line address data for designating a scanning electrode and image data PD0–PD3 for pixels on the scanning line designated by the address data to a display drive circuit constituted by a scanning line drive circuit 104 and a data line drive circuit 105 of a liquid crystal display apparatus 101. In this embodiment, scanning line address data (A0–A15) and display data (D0–D1279) must be differentiated. A signal AH/DL is used for the differentiation. The AH/DL signal at a high (Hi) level represents scanning line address data, and the AH/DL signal at a low (Lo) level represents display data.

The scanning line address data is extracted from the image data PD0–PD3 in a drive control circuit 111 in the liquid crystal display apparatus 101 outputted to the scanning line drive circuit 104 in synchronism with the timing of driving a designated scanning line. The scanning line address data is inputted to a decoder 106 within the scanning line drive circuit 104, and a designated scanning electrode within a display panel is driven by a scanning signal generation circuit 107 via the decoder 106. On the other hand, display data is introduced to a shift register 108 within the data line drive circuit 105 and shifted by four pixels as a unit based on a transfer clock pulse. When the shifting for 1280 pixels on a horizontal one scanning line is completed by the shift register 108, display data for the 1280 pixels are transferred to a line memory 109 disposed in parallel, memorized therein for a period of one horizontal scanning period and outputted to the respective data electrodes from a data signal generation circuit 110.

Further, in this embodiment, the drive of the display panel 103 in the liquid crystal display apparatus 101 and the generation of the scanning line address data and display data in the graphic controller 102 are performed in a non-synchronous manner, so that it is necessary to synchronize the graphic controller 102 and the display apparatus 101 at the time of image data transfer. The synchronization is performed by a signal SYNC which is generated for each one horizontal scanning period by the drive control circuit 111 within the liquid crystal display apparatus 101. The graphic controller 102 always watches the SYNC signal, so that image data is transferred when the SYNC signal is at a low level and image data transfer is not performed after transfer of image data for one scanning line at a high level. More specifically, referring to FIG. 12, when a low level of the SYNC signal is detected by the graphic controller 102, the AH/DL signal is immediately turned to a high level to start the transfer of image data for one horizontal scanning line. Then, the SYNC signal is turned to a high level by the drive control circuit 111 in the liquid crystal display apparatus 101. After completion of writing in the display panel 103 with lapse of one horizontal scanning period, the drive control circuit 111 again returns the SYNC signal to a low level so as to receive image data for a subsequent scanning line.

The compensation pulse (2') described with reference to FIGS. 11A and 11B is generated as a combination of pulses generated in compensation pulse generating circuits 120 and 121 within the scanning signal generation circuit 107 and the data signal generation circuit 105, respectively. The compensation pulse-generating circuits may include a gate circuit wherein the gate is opened and closed at prescribed time to provide reference voltage which are opposite in polarity to but have the same peak values (absolute values) as the reference voltages of the second pulses.

EXAMPLE 1

Figure 14:
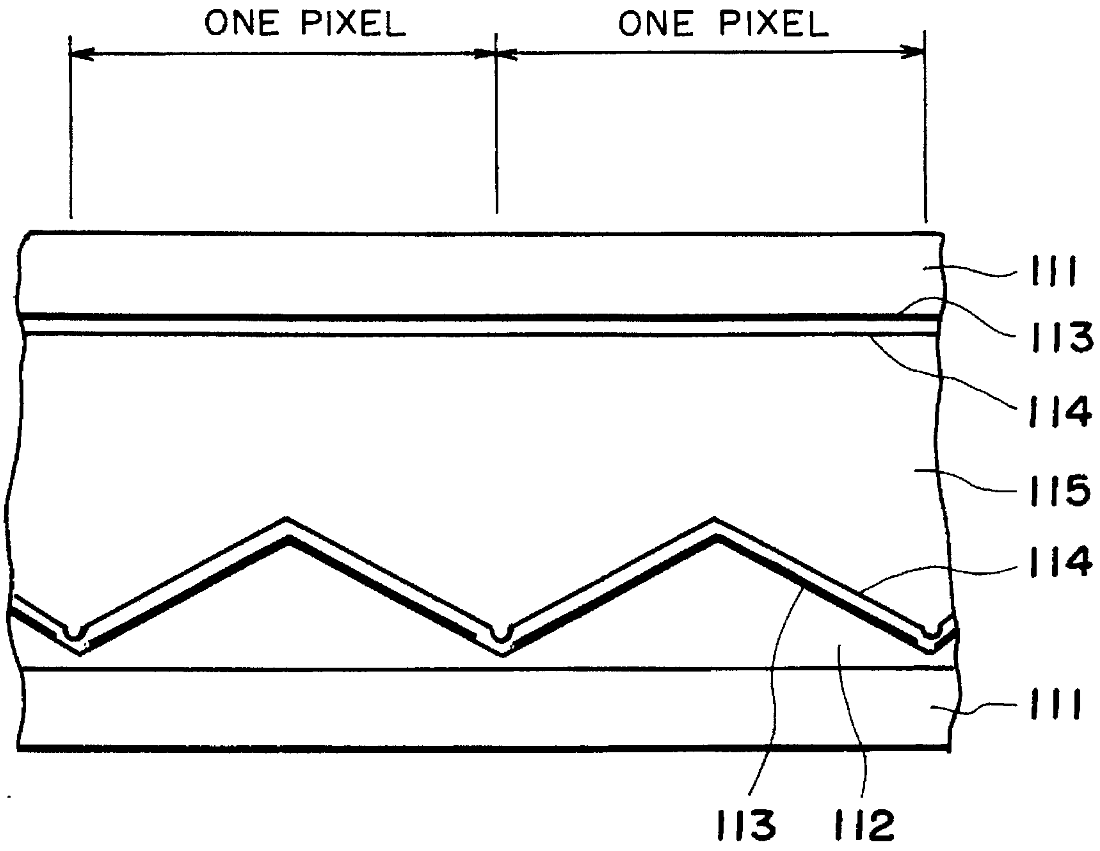
FIG. 14 is a schematic view of a liquid crystal cell (device) applicable to the invention.

In a specific example, a liquid crystal cell having a sectional structure as shown in FIG. 14 was prepared. The lower glass substrate 111 was provided with a saw-teeth shape cross section by transferring an original pattern formed on a mold onto a UV-curable resin layer applied thereon to form a cured acrylic resin layer 112.

The thus-formed UV-cured uneven resin layer 112 was then provided with stripe electrodes 113 of ITO film by sputtering and then coated with a sputtered $Ta_2O_5$ insulating film and an alignment film 114 (formed with "LQ-1802", available from Hitachi Kasei K. K.).

The upper glass substrate 111 was treated in the same manner as the lower substrate except for the omission of the UV-cured resin layer 112.

Both substrates (more accurately, the alignment films thereon) were rubbed respectively in one direction and superposed with each other so that their rubbing directions were roughly parallel but the rubbing direction of the lower substrate formed a clockwise angle of about 10 degrees with respect to the rubbing direction of the upper substrate. The cell thickness (spacing) was controlled to be from about 1.10 μm as the smallest thickness to about 1.65 μm as the largest thickness.

Then, the cell was filled with a chiral smectic liquid crystal A showing the following phase transition series and properties to form a liquid crystal cell (display panel).

TABLE 1

(liquid crystal A)

$$\text{Iso.} \underset{81.8^\circ\text{ C.}}{\overset{82.3^\circ\text{ C.}}{\rightleftharpoons}} \text{Ch} \underset{77.3^\circ\text{ C.}}{\overset{76.6^\circ\text{ C.}}{\rightleftharpoons}} \text{SmA*} \overset{54.8^\circ\text{ C.}}{\rightleftharpoons} \text{SmC*} \quad \text{SmC*} \underset{-20.9^\circ\text{ C.}}{\overset{-2.5^\circ\text{ C.}}{\rightleftharpoons}} \text{Cryst}$$

Ps = −5.8 nC/cm$^2$ (30° C.)
Tilt angle = 14.3 deg. (30° C.)
$\Delta\epsilon \approx -0$ (30° C.)

Figure 15:
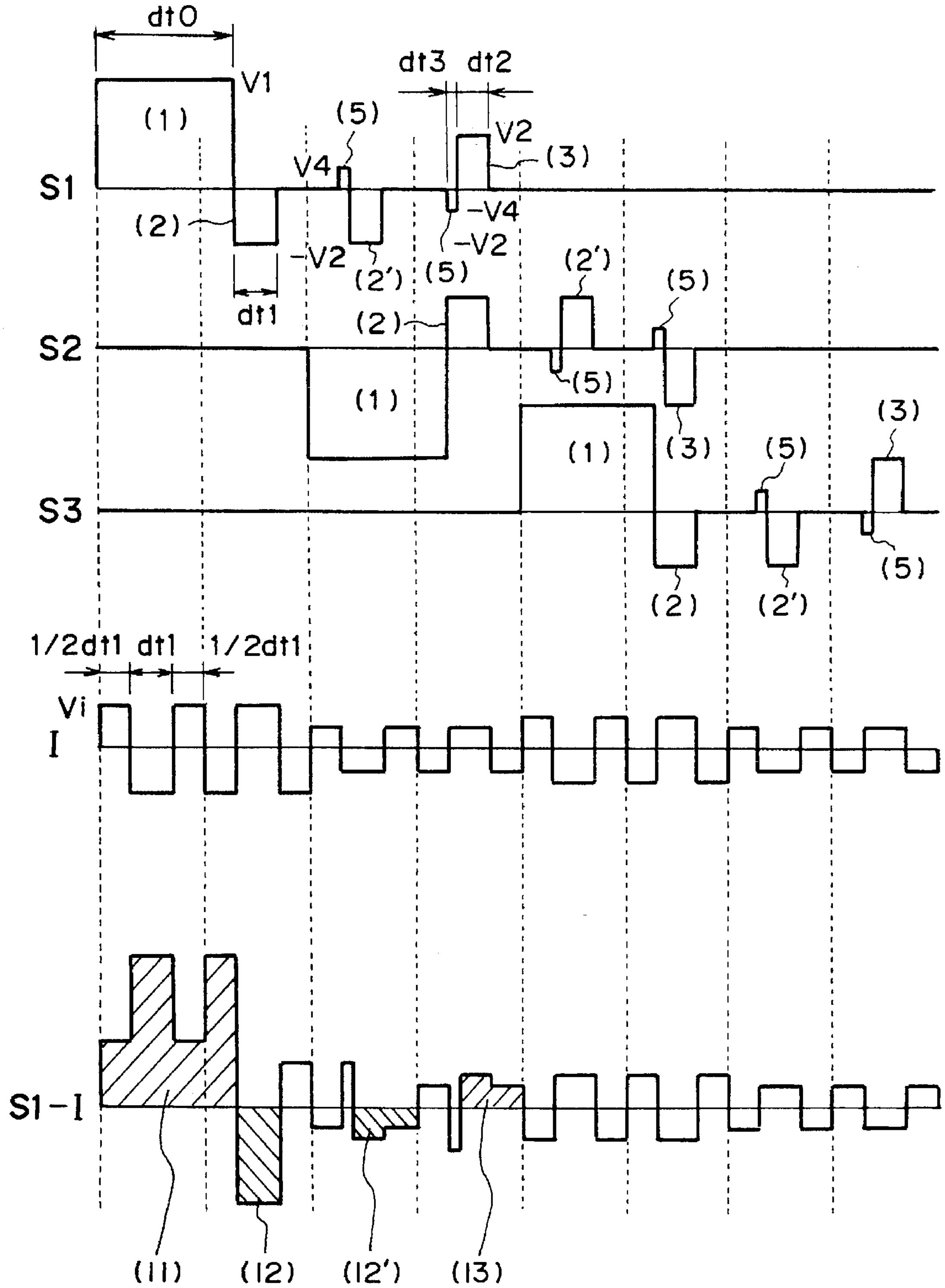
FIG. 15 is a waveform diagram showing a time-serial set of drive waveforms used in a first embodiment of the invention.

In this example, display was performed by applying a set of drive signals shown in FIG. 15 to the display panel by using a system shown in FIG. 12. Referring to FIG. 15, at S1–S3 is respectively shown a scanning signal including a reset pulse (1), a first writing pulse (2), a compensation pulse (2') and a second writing pulse (3). The scanning signal further includes minor pulses (5) which are auxiliary pulses for suppressing application of DC voltage components.

At I is shown a succession of data signals which have different peak values (voltages) Vi depending on gradation levels to be displayed.

At SI-I are shown combined voltage signals applied to a pixel (liquid crystal) at an intersection of a scanning line S1 and a data line I, including a reset voltage (11), a first writing voltage (12), a compensation voltage (12') and a second writing voltage (13). As shown in FIG. 15, the voltage pulses (12') and (13) are different from each other only in polarity.

In this example, the signals used were characterized by the respective parameters in FIG. 15 of $|V_1|$=20.0 volts, $|V_2|$=17.2 volts, $V_4$=4 volts, Vi=−3.4 volts to +3.4 volts, dt1=40 μs, dt2=27 μs and dt3=13 μs. Herein, the gradational display was performed by voltage modulation wherein $V_2$ +Vi=13.8 volts provided 0% and 20.6 volts provided 100% with an intermediate voltage providing a halftone level.

Figure 16:
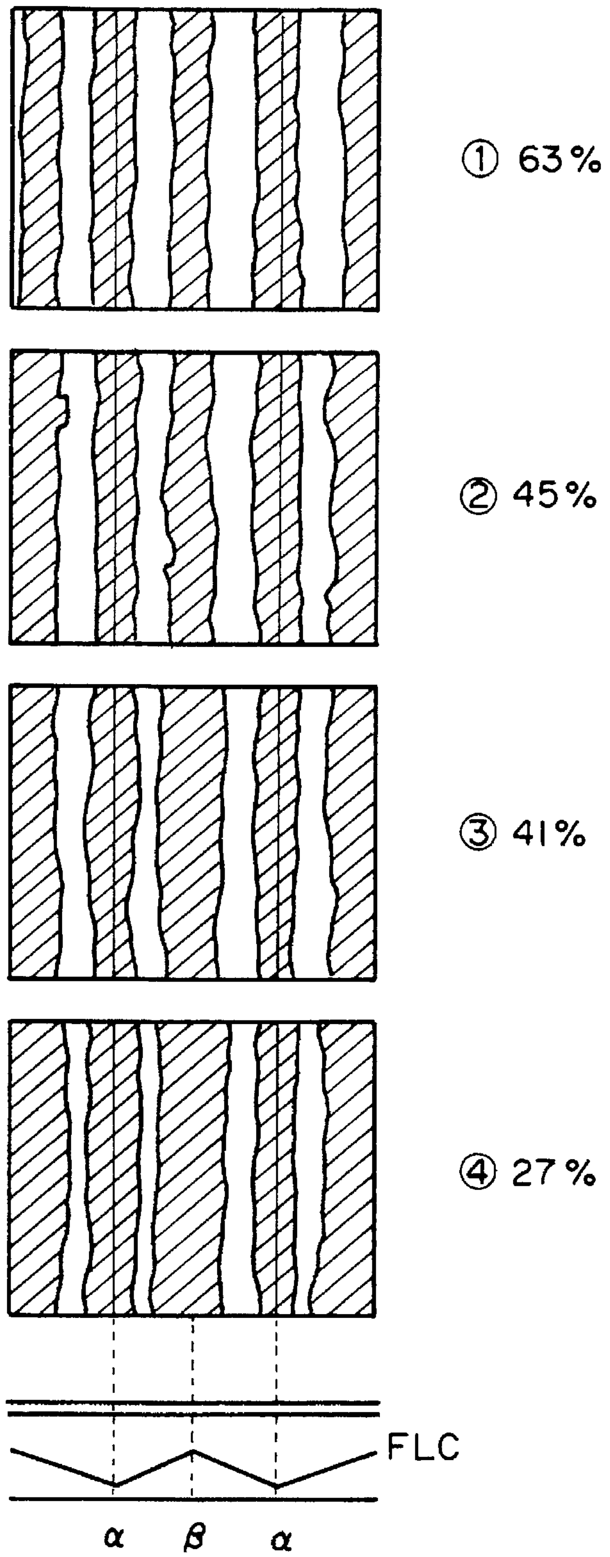
FIG. 16 illustrates some microscopic pixel states formed in the first embodiment.

FIG. 16 illustrates the states of domain formation in a pixel shown in FIG. 14 when supplied with the drive signal shown in FIG. 15. Referring to FIG. 16, a part α corresponds to a cell thickness (liquid crystal layer thickness) of about 1.65 μm and a part β corresponds to a cell thickness of about 1.1 μm. As a result, a pixel wholly reset in a black state is partly written in white from a portion corresponding to the part β by application of a voltage corresponding to a selection signal pulse (2) in FIG. 15 while leaving a remaining black portion at α. Then, by application of a voltage corresponding to a selection signal pulse (3), the second writing is started from the part β. As described above, in this second writing, it is desired that the domain wall formed in the first writing does not move. In an actual drive by using the drive signals shown in FIG. 15, it was confirmed that the domain walls did not move in display of pixels at any of gradation levels ①–④. This means that the drive scheme using the signals shown in FIG. 15 realized a good gradational display.

Figure 17:
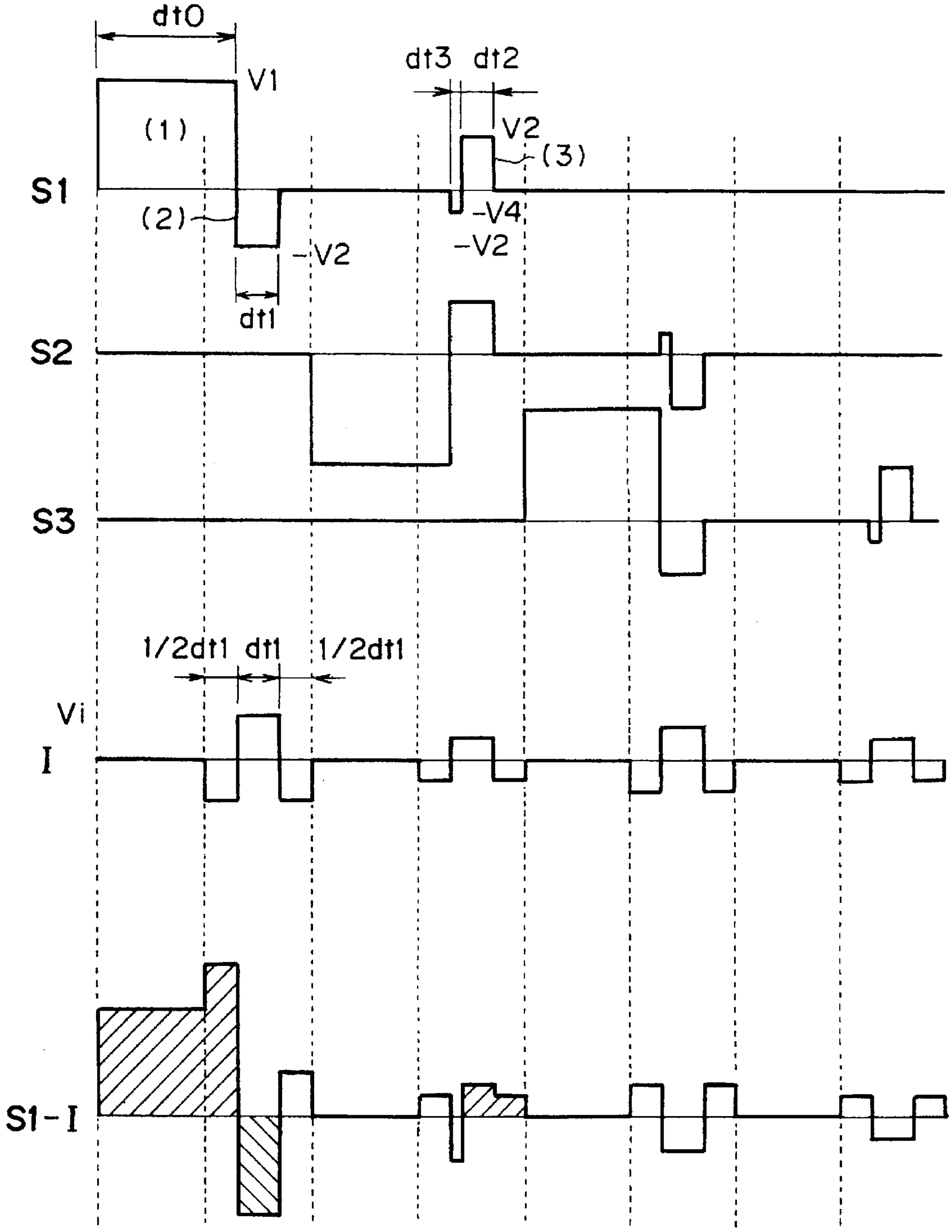
FIG. 17 is a waveform diagram showing a set of time-serial drive waveforms used in a comparative example.
Figure 18:
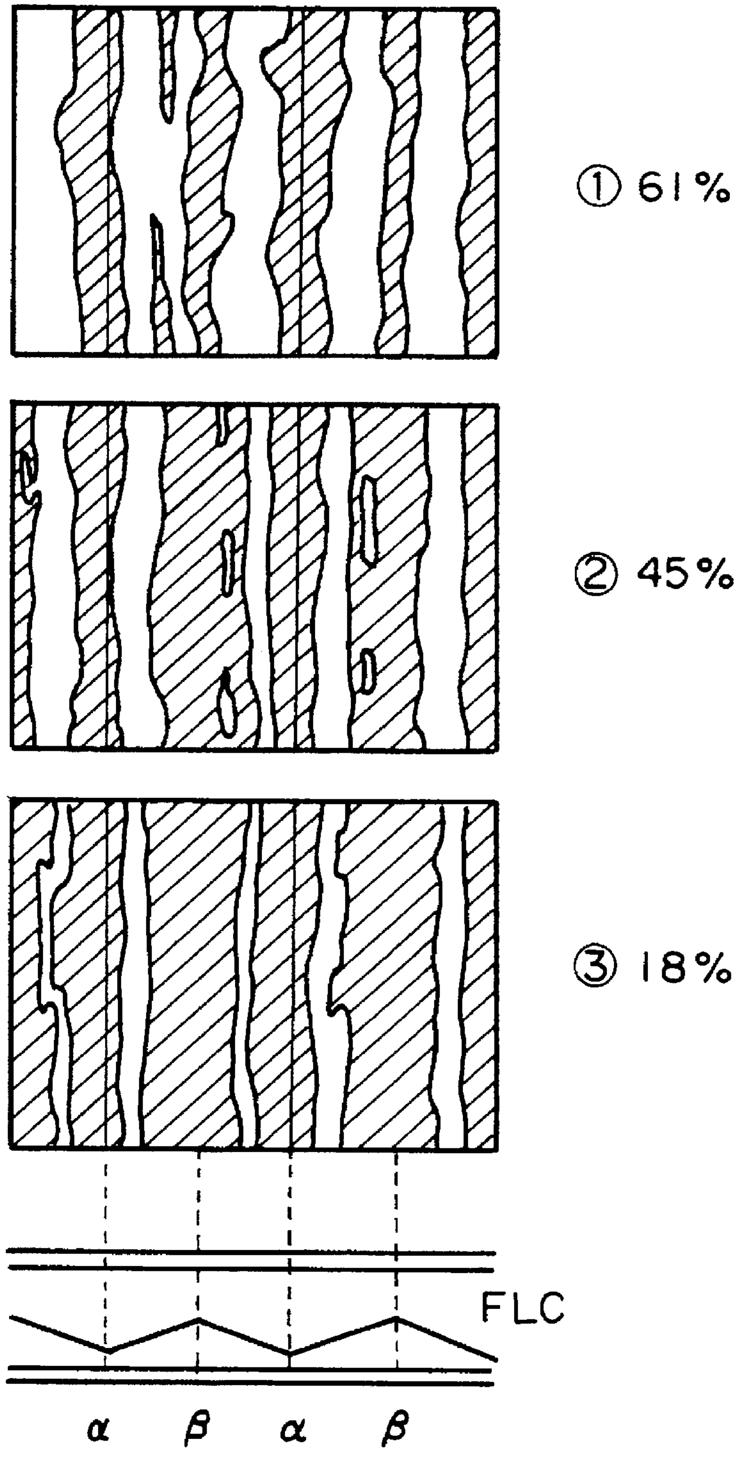
FIG. 18 illustrates microscopic pixel states formed in the comparative example.

On the other hand, in case where the same display panel was driven by applying a comparative set of drive signals shown in FIG. 17 having the parameters set at respectively the same levels as in the case of FIG. 15, the domain walls formed by application of a voltage corresponding to a selection signal pulse (2) (first writing) were observed to move in response to application of a voltage corresponding to a selection signal pulse (3). The resultant pixel states in the comparative example are shown in FIG. 18 wherein a part α corresponded to the thickness part (about 1.65 μm) and a part β corresponded to the thinnest part (about 1.1 μm). As a result of the first writing by application of a voltage corresponding to a selection pulse (2) after resetting to black, a region corresponding to a part β is written in white while leaving a region corresponding to a part a in black. Then, in the second writing by application of a voltage corresponding to a selection pulse (3), a region surrounding a portion corresponding to the part β is again writing in black.

Now, if the domain width of the black domain corresponding to the part α, the domain width is observed in the order of ①, ② and ③. This means that, in the pixel shift method, the data expected to be shifted from a subsequent scanning line to a scanning line concerned is not caused with adequate control of the shifting quantity. In other words, if a higher voltage is applied to a pixel on a subsequent scanning line, a domain wall already present in a pixel is moved in a larger quantity, whereby the linear additivity of domain inversion is not satisfied, thus making the control extremely difficult or degrading the accuracy of gradational display.

In the present invention, however, as explained with reference to FIGS. 15 and 16, such movement of domain wall deteriorating the gradational display quality is suppressed by application of a compensation signal.

In the above-mentioned embodiment, an inversion threshold distribution in a pixel is provided by a slope of cell thickness (liquid crystal layer thickness). It is however also possible to provide an inversion threshold distribution in a pixel by forming minute unevennesses with a certain distribution. Thus, the method of domain wall control according to the present invention is applicable not only to the case wherein the domain is enlarged one-dimensionally but also to the case wherein the domain is enlarged two-dimensionally.

As described above, according to the present invention, it has become possible to avoid the degradation in quality of gradational display based on plural times of writing in a pixel for a single display, thus realizing a good quality of gradational display.

What is claimed is:

1. A driving method for a liquid crystal device of the type comprising a group of scanning electrodes, a group of data electrodes intersecting the scanning electrodes so as to form an electrode matrix, a liquid crystal disposed to form a pixel at each intersection of the scanning electrodes and the data electrodes, each pixel comprising the liquid crystal disposed between a pair of opposing electrodes and defining a pixel area in which there is formed a distribution of applied voltage threshold for causing inversion of orientation state of the liquid crystal, the driving method comprising:

a first step of resetting the liquid crystal in a prescribed pixel uniformly into a first orientation state by applying a reset signal to an associated scanning electrode;

a second step of applying a first writing signal to the associated scanning electrode and a data electrode associated with the prescribed pixel to partially switch the liquid crystal in the prescribed pixel into a second orientation state different from the first orientation state;

a third step of applying first and second selection signals to the associated scanning electrode and first and second data signals to the associated data electrode to provide combined signals which are applied to the prescribed pixel, so as to switch a portion of the liquid crystal in the prescribed pixel that was partially switched into the second orientation state back into the first orientation state, said combined signals forming a bipolar signal including a positive pulse and a negative pulse of identical shape; and a fourth step of applying a non-selection signal to the associated scanning electrode to retain a resultant display state of the prescribed pixel.

2. A method according to claim 1, wherein the positive pulse and the negative pulse in the bipolar signal applied to the scanning electrode are respectively preceded by a smaller voltage pulse of an opposite polarity.

3. A method according to claim 1, wherein the liquid-crystal is a ferroelectric liquid crystal.

4. A liquid crystal display apparatus, comprising:

a liquid crystal device of a type comprising a group of scanning electrodes, a group of data electrodes intersecting the scanning electrodes so as to form an electrode matrix, a liquid crystal disposed to form a pixel at each intersection of the scanning electrodes and the data electrodes, each pixel comprising the liquid crystal disposed between a pair of opposing electrodes and defining a pixel area in which there is formed a distribution of applied voltage threshold for causing inversion of orientation state of the liquid crystal, and drive means for sequentially:

resetting the liquid crystal in a prescribed pixel uniformly into a first orientation state by applying a reset signal to an associated scanning electrode;

applying a first writing signal to the associated scanning electrode and a data electrode associated with the prescribed pixel to partially switch the liquid crystal in the prescribed pixel into a second orientation state different from the first orientation state;

applying first and second selection signals to the associated scanning electrode and first and second data signals to the associated data electrode to provide combined signals which are applied to the prescribed pixel, so as to switch a portion of the liquid crystal in the prescribed pixel that was partially switched into the second orientation state back into the first orientation state, said confined signals forming a bipolar signal including a positive pulse and a negative pulse of identical shape; and applying a non-selection signal to the associated scanning electrode to retain a resultant display state of the prescribed pixel.

5. An apparatus according to claim 4, wherein the positive pulse and the negative pulse in the bipolar signal applied to the scanning electrode are respectively preceded by a smaller voltage pulse of an opposite polarity.

6. An apparatus according to claim 4, wherein said liquid crystal is a ferroelectric liquid crystal.

* * * * *

UNITED STATES PATENT AND TRADEMARK OFFICE

CERTIFICATE OF CORRECTION

PATENT NO. : 5,646,755
DATED : July 8, 1997
INVENTOR(S) : SHINJIRO OKADA, ET AL.

It is certified that error appears in the above-identified patent and that said Letters Patent is hereby corrected as shown below:

COLUMN 3

Line 6, "No. 681,933," should read --No. 681,993,--.

Signed and Sealed this

Twenty-third Day of December, 1997

Attest:

BRUCE LEHMAN

Attesting Officer

*Commissioner of Patents and Trademarks*